(12) United States Patent
Satoh et al.

(10) Patent No.: US 9,201,253 B2
(45) Date of Patent: Dec. 1, 2015

(54) DISPLAY DEVICE

(75) Inventors: Eiji Satoh, Osaka (JP); Akio Miyata, Osaka (JP); Kazuhiro Deguchi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 198 days.

(21) Appl. No.: 13/994,937

(22) PCT Filed: Dec. 15, 2011

(86) PCT No.: PCT/JP2011/079049
§ 371 (c)(1),
(2), (4) Date: Jun. 17, 2013

(87) PCT Pub. No.: WO2012/086516
PCT Pub. Date: Jun. 28, 2012

(65) Prior Publication Data
US 2013/0286334 A1    Oct. 31, 2013

(30) Foreign Application Priority Data
Dec. 20, 2010    (JP) ................................ 2010-282724

(51) Int. Cl.
*G02B 26/00* (2006.01)
*G02F 1/15* (2006.01)
(Continued)

(52) U.S. Cl.
CPC ................ *G02F 1/01* (2013.01); *G02B 26/005* (2013.01); *G02F 1/13476* (2013.01); *G02F 1/133514* (2013.01); *G02F 1/157* (2013.01); *G02F 1/167* (2013.01); *G02F 1/1334* (2013.01);
(Continued)

(58) Field of Classification Search
CPC ............ B41F 7/02; G02F 1/157; G02F 1/01; G02F 1/155; G02B 26/001
USPC .......... 359/237, 265–275, 296; 345/105, 107; 349/1, 193
See application file for complete search history.

(56) References Cited

U.S. PATENT DOCUMENTS 4,828,369 A * 5/1989 Hotomi .......................... 359/270
8,284,242 B2 * 10/2012 Wang et al. ..................... 348/51
(Continued)

FOREIGN PATENT DOCUMENTS

JP    07-043753 A    2/1995
JP    2003-280042 A    10/2003
(Continued)

OTHER PUBLICATIONS

English translation of Official Communication issued in corresponding International Application PCT/JP2011/079049, mailed on Jul. 4, 2013.
(Continued)

*Primary Examiner* — Tuyen Tra
(74) *Attorney, Agent, or Firm* — Keating & Bennett, LLP (57) ABSTRACT

A display device (100A) includes a first substrate (11) and second substrate (41) that are placed so as to face each other; active color filter layers (32) which are placed between the first substrate (11) and the second substrate (41), which have memory properties, and which become in a colored state or an uncolored state depending on the voltage applied thereto; and a light-modulating layer (17) for controlling the intensity or degree of scattering of light incident on the active color filter layers (32) or the intensity or degree of scattering of light passing through the active color filter layers (32).

16 Claims, 7 Drawing Sheets

(51) Int. Cl.
*G02F 1/01* (2006.01)
*G02F 1/157* (2006.01)
*G02F 1/167* (2006.01)
*G02F 1/1335* (2006.01)
*G02F 1/1347* (2006.01)
G02F 1/1334 (2006.01)
G02F 1/135 (2006.01)

(52) U.S. Cl.
CPC .......... *G02F 1/15* (2013.01); *G02F 2001/1351* (2013.01); *G02F 2001/13345* (2013.01); *G02F 2001/13347* (2013.01); *G02F 2201/44* (2013.01); *G02F 2203/34* (2013.01); *G02F 2203/62* (2013.01)

(56) References Cited

U.S. PATENT DOCUMENTS

| | | |
|---|---|---|
| 2003/0011728 A1 | 1/2003 | Battersby |
| 2003/0184692 A1 | 10/2003 | Nagae |
| 2007/0126676 A1 | 6/2007 | Kim et al. |
| 2008/0137168 A1 | 6/2008 | Abe |
| 2010/0309541 A1* | 12/2010 | Lo et al. ........................ 359/292 |

FOREIGN PATENT DOCUMENTS

| | | |
|---|---|---|
| JP | 2004-521396 A | 7/2004 |
| JP | 2007-156497 A | 6/2007 |
| JP | 2008-145867 A | 6/2008 |
| JP | 2009-265271 A | 11/2009 |
| WO | 2012/086468 A1 | 6/2012 |

OTHER PUBLICATIONS

Official Communication issued in International Patent Application No. PCT/JP2011/079049, mailed on Feb. 21, 2012.

Deguchi et al., "Display Device", U.S. Appl. No. 13/994,942, filed Jun. 17, 2013.

* cited by examiner

DISPLAY DEVICE

TECHNICAL FIELD

The present invention relates to display devices and particularly relates to a liquid crystal display device.

BACKGROUND ART

Liquid crystal display devices widely used at present include color filters corresponding to pixels. In particular, color filters corresponding to light's three primary colors of red (R), green (G), and blue (B), are arranged in a predetermined pattern so as to correspond to pixels. A plurality of primary color filters (typically three colors: R, G, and B) form a color display pixel.

In general, liquid crystal display devices each include a pair of substrates and a liquid crystal layer placed therebetween. A color filter layer including a plurality of color filters that are arranged to correspond to pixels as described above is assigned to either one of the substrates. A liquid crystal display device includes, for example, a TFT substrate including circuit elements such as pixel electrodes and TFTs (thin-film transistors), a counter substrate including counter electrodes and color filters, and a liquid crystal layer placed therebetween. The counter substrate, which includes the color filters, is sometimes referred to as a color filter substrate.

However, conventional color filters make use of the absorption of light by pigments and therefore liquid crystal display devices including such color filters have low light use efficiency. In particular, the intensity of light that enters a color filter to pass through the color filter is about ⅓ (one-third) of the intensity of light incident on the color filter, leading to a reduction in lightness. Especially, in a reflective liquid crystal display device using external light, highly visible color display is achieved under bright circumstances and, however, there is a problem in that highly visible color display is unlikely to be achieved under dark circumstances.

Patent Literatures 1 to 3 disclose color display devices, including color liquid crystal display devices, for solving these problems.

CITATION LIST

Patent Literature

PTL 1: Japanese Unexamined Patent Application Publication No. 2008-145867
PTL 2: Japanese Unexamined Patent Application Publication (Translation of PCT Application) No. 2004-521396
PTL 3: Japanese Unexamined Patent Application Publication No. 2007-156497

SUMMARY OF INVENTION

Technical Problem

However, color filters included in a display device disclosed in Patent Literature 1 require elements, such as TFTs, for driving an electrochromic dye for each pixel and therefore the pixels have reduced aperture ratio. This results in the reduction in transmittance of light and the reduction in visibility of a displayed image. Electrical power needs to be always supplied for the purpose of coloring the color filters; hence, the display device has increased power consumption.

The present invention has been made in view of the above circumstances and is intended to provide a display device, having low power consumption, for obtaining a highly visible image.

Solution to Problem

A display device according to the present invention includes a first substrate and second substrate that are placed so as to face each other; active color filter layers which are placed between the first substrate and the second substrate, which have memory properties, and which become in a colored state or an uncolored state depending on the voltage applied thereto; and a light-modulating layer for controlling the intensity or degree of scattering of light incident on the active color filter layers or the intensity or degree of scattering of light passing through the active color filter layers.

In an embodiment, the active color filter layers are electrochromic layers.

In an embodiment, the electrochromic layers include oxidation-type electrochromic sub-layers containing an oxidation-type color-developing material and reduction-type electrochromic sub-layers containing a reduction-type color-developing material and, in a pixel, the oxidation-type color-developing material and the reduction-type color-developing material are different in light absorption wavelength from each other when being in a colored state.

In an embodiment, the oxidation-type electrochromic sub-layers each include a first oxidation-type electrochromic region which extends over two pixels neighboring in a row direction and which contains a single oxidation-type color-developing material and the reduction-type electrochromic sub-layers each include a first reduction-type electrochromic region which extends over two pixels neighboring in the row direction and which contains a single reduction-type color-developing material.

In an embodiment, the oxidation-type electrochromic sub-layers each include a second oxidation-type electrochromic region which corresponds to two pixels neighboring in the row direction and which includes two portions each containing a corresponding one of oxidation-type color-developing materials that are different in light absorption wavelength from each other when being in a colored state, the reduction-type electrochromic sub-layers each include a second reduction-type electrochromic region which corresponds to two pixels neighboring in the row direction and which includes two portions each containing a corresponding one of reduction-type color-developing materials that are different in light absorption wavelength from each other when being in a colored state, and the electrochromic layers are configured such that the first oxidation-type electrochromic region faces the second reduction-type electrochromic region and the first reduction-type electrochromic region faces the second oxidation-type electrochromic region.

In an embodiment, the active color filter layers are electrophoretic layers.

In an embodiment, the display device further includes first electrodes for applying a voltage to the electrophoretic layers and a second electrode and the size of the first electrodes is less than the size of the second electrode.

In an embodiment, the first electrodes are placed in light-shielding regions of the display device when viewed in a direction normal to a screen of the display device.

In an embodiment, the display device further includes a backlight.

In an embodiment, the display device is a see-through display device.

In an embodiment, the active color filter layers are placed closer to the side where, among lights incident on the see-through display device, strong light is incident than the light-modulating layer.

In an embodiment, the active color filter layers are placed closer to the observer side than the light-modulating layer.

In an embodiment, the active color filter layers are placed on the first substrate side of the light-modulating layer and other active color filter layers are placed on the second substrate side of the light-modulating layer.

In an embodiment, the display device further includes a layer containing a conductive polymer or solid electrolyte and a voltage is applied to the active color filter layers through the conductive polymer or solid electrolyte-containing layer.

In an embodiment, a protective layer is placed on the active color filter layer side or light-modulating layer side of the conductive polymer or solid electrolyte-containing layer.

In an embodiment, a transparent electrode is placed on the light-modulating layer side of the conductive polymer or solid electrolyte-containing layer and the protective layer is placed on the active color filter layer side or light-modulating layer side of the transparent electrode.

In an embodiment, the display device further includes a protective layer having a first principal surface and a second principal surface parallel to the first principal surface, an electrode is placed on each of the first principal surface and the second principal surface, and a voltage is applied to the active color filter layers through one of the electrodes that is on the active color filter layer side.

In an embodiment, the light-modulating layer is an electrowetting layer.

In an embodiment, the light-modulating layer is a liquid crystal layer.

In an embodiment, the light-modulating layer is a scattering liquid crystal layer.

In an embodiment, the light-modulating layer is a PDLC layer or a PNLC layer.

In an embodiment, the display device further includes color filter layers and the active color filter layers are placed so as to overlap the color filters when viewed in the direction normal to the screen of the display device.

Advantageous Effects of Invention

According to the present invention, a high-visibility image is obtained and a display device with low power consumption is provided.

DESCRIPTION OF EMBODIMENTS

Display devices 100A to 100E according to embodiments of the present invention will now be described with reference to the drawings.

A display device 100A according to an embodiment of the present invention is described with reference to FIGS. 1 to 3. The display device 100A is a reflective display device. A display device 100A1 and a display device 100A2 are reflective liquid crystal display devices and a display device 100A3 is a reflective electrowetting display device.

FIG. 1(a) is a schematic sectional view of the display device 100A1.

Figure 1:
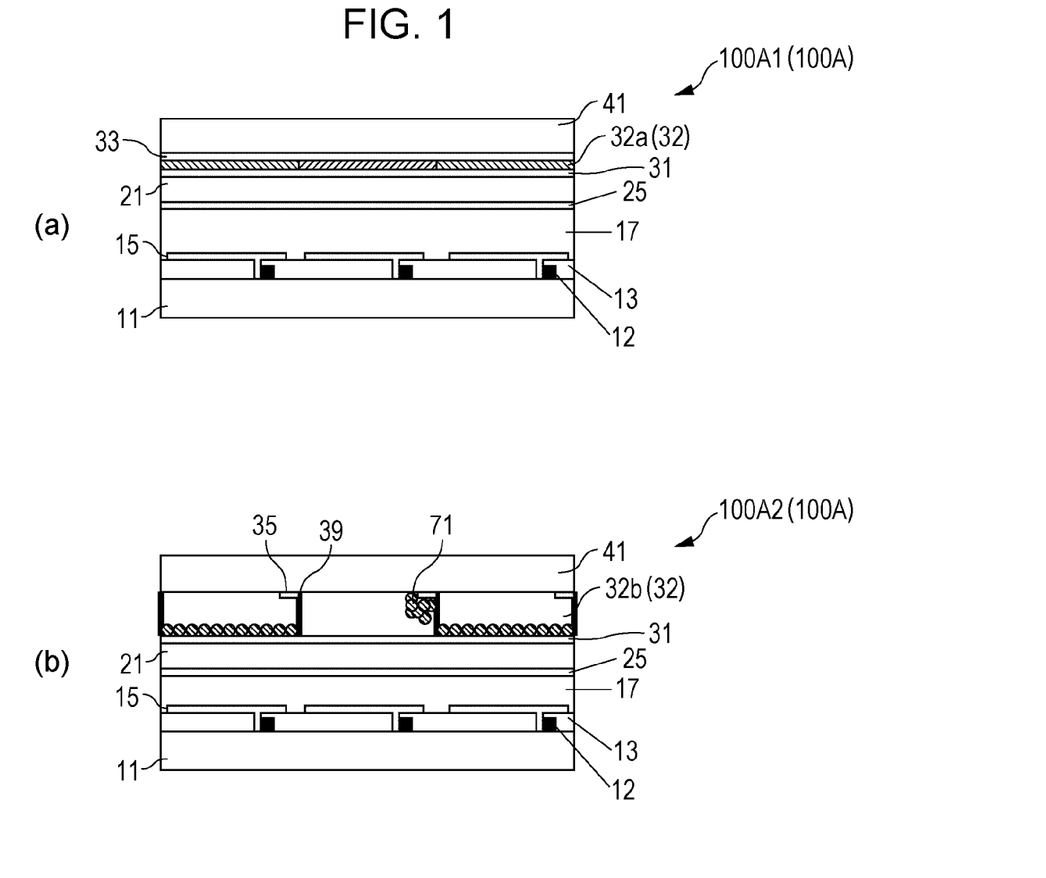
FIGS. 1(a) and 1(b) are schematic sectional views of display devices 100A1 and 100A2 (100A) according to embodiments of the present invention.

The display device 100A1 shown in FIG. 1(a) includes a first substrate (for example, a glass substrate) 11, an insulating substrate (for example, a glass substrate) 21 facing the first substrate 11, a light-modulating layer 17 placed between the first substrate 11 and the insulating substrate 21. The first substrate 11 and the insulating substrate 21 have transparent electrodes 15 and 25, respectively, made of, for example, ITO (indium tin oxide). The light-modulating layer 17 is placed between the transparent electrodes 15 and the transparent electrode 25. The display device 100A1 further includes a second substrate (for example, a glass substrate) 41 which is located opposite to the first substrate 11 and which faces the first substrate 11 and layers (active color filter layers) 32 which are placed between the insulating substrate 21 and the second substrate 41, which have memory properties, and which become in a colored state or an uncolored state depending on the voltage applied thereto. The term "uncolored state" as used herein refers to such a state that the transmittance of visible light is 40% or more and preferably 70% or more. The active color filter layers 32 and the light-modulating layer 17 are placed between the first substrate 11 and the second substrate 41. The light-modulating layer 17 is a layer that controls the intensity or degree of scattering of light incident on the active color filter layers 32 or the intensity or degree of scattering of light passing through the active color filter layers 32. A transparent electrode 31 made of ITO or the like is placed on the opposite side of the insulating substrate 21 from the light-modulating layer 17. A transparent electrode 33 is placed on the light-modulating layer 17 side of the second substrate 41. The active color filter layers 32 are placed between the transparent electrode 31 and the transparent electrode 33. The first substrate 11 has active elements 12, such as TFTs, for each pixel. An insulating layer 13 is placed between the first substrate 11 and the transparent electrodes 15. The active elements 12 are electrically connected to the transparent electrodes 15 through contact holes formed in the insulating layer 13. The light-modulating layer 17 may be passively driven without the active elements 12. In this case, the transparent electrodes 15 and 28 are formed in a stripe pattern. A reflector, which is not shown in FIG. 1(*a*), reflecting visible light is placed on the opposite side of the first substrate 11 of the display device 100A1 from the light-modulating layer 17; hence, display can be performed in a reflective mode using light coming from the second substrate 41. In the case where the display device 100A1 is an IPS (in-plane switching)-mode or FFS (fringe field switching)-mode liquid crystal display device, the transparent electrode 25 can be omitted. The insulating layer 13 can also be appropriately omitted.

The active color filter layers 32 may be configured such that various colors can be displayed in such a manner that a plurality of colors (for example, R, G, and B) are arranged for each pixel as shown in FIG. 1(*a*). Alternatively, a mono-color or an area color may be displayed in such a manner that a single color is uniformly placed or is placed in a region in the display device 100A1 or a plurality of colors are arranged for each of separated regions in the display device 100A1.

In the display device 100A1, the active color filter layers 32 are, for example, layers (referred to as electrochromic layers) 32*a* containing an electrochromic material. When there is no absorption wavelength in a desired absorption wavelength, a plurality of electrochromic layers 32*a* may be stacked.

In general, the electrochromic layers 32*a* are layers in which the electrochromic material present in an electrolytic solution is oxidized or reduced by the application of a voltage to become in a colored or uncolored state. The electrolytic solution contains a solvent such as acrylonitrile, NMP (1-methyl-2-pyrrolidone), or DMSO (dimethyl sulfoxide) and an electrolyte such as TBAP (tetraethylammonium perchlorate) or TEAP (tetrabutylammonium perchlorate). For example, a styryl dye or the like is used as a type of material that exhibits a color by the oxidation of the electrochromic material. A phthalic acid derivative, viologen, or the like is used a type of material that exhibits a color by the reduction of the electrochromic material. Furthermore, ferrocene or the like is preferably used as a counter agent. When the electrochromic material is, for example, a reduction-type color-developing material, the counter agent has the effect of promoting oxidation in an electrode facing an electrode contributing to the color development of the material.

In usual, the electrochromic material has substantially no memory properties in such a state that the electrochromic material is dispersed in a solution. The reason therefor is that when the supply of electricity is stopped, coloring molecules diffuse and donate or receive electrons to or from the counter agent to become uncolored. A method of providing memory properties is such a way that a carboxylic acid, phosphoric acid, or the like is introduced into the electrochromic material so as to serve as an anchor and the electrochromic material is adsorbed on fine particles of titanium oxide, zinc oxide, or the like formed on a substrate. Another method is such a way that the viscosity of an electrolytic solution is increased by the addition of a polymer or the like or a way such as gelation or solidification. These methods have the effect of preventing or suppressing the diffusion of the colored electrochromic material. A method of separately forming a plurality of color-developing materials is such a way that, for example, fine particles of titanium oxide or the like are formed on a substrate and the electrochromic material dissolved in a solvent is provided on the fine particles using an ink jet device for each color-developing material.

For example, in a bright place, the display device 100A1 performs full-color display, mono-color display, or area color display in such a manner that the electrochromic layers 32*a* are put in a colored state. When the display device 100A1 is in a dark place or monochrome display needs to be performed, the display device 100A1 can perform high-lightness display in such a manner that the electrochromic layers 32*a* are put in an uncolored state. Therefore, in reflective display in which display is performed using external light only without using a light source, color display including color information and high-lightness display valuing visibility can be arbitrarily switched depending on a lighting environment.

The electrochromic layers 32*a* have memory properties and therefore power consumption can be suppressed. The chroma and the lightness can be arbitrarily adjusted by adjusting the voltage applied to the electrochromic layers 32*a*.

A display device 100A2 having the same effect as that of the display device 100A1 is described below. Components common to those of the display device 100A1 are denoted by the same reference numerals and the duplication of description is avoided.

FIG. 1(*b*) is a schematic sectional view of the display device 100A2.

The display device 100A2 is a display device in which electrophoretic layers 32*b* are used instead of the electrochromic layers 32*a* of the display device 100A1 and line-shaped transparent electrodes 35 are used instead of the transparent electrode 33 of the display device 100A1. The shape of the transparent electrodes 35 is not limited to this shape. The transparent electrode 31 is different in size from the transparent electrodes 35. For example, the size of the transparent electrodes 35 is less than the size of the transparent electrode 31. Electrodes made of an opaque metal (for example, Al (aluminium)) may be used instead of the transparent electrodes 35.

The electrophoretic layers 32*b* have resin walls 39 located between pixels. Each pixel contains charged colored fine particles 71 containing pigment or dye. For example, red, blue, and green charged colored fine particles 71 are contained in desired pixels.

In FIG. 1(*b*), one of the electrophoretic layers 32*b* that corresponds to the center pixel is in an uncolored state in order to simplify the mode of driving. The electrophoretic layers 32*b* corresponding to the other pixels are in a colored state. The charged colored fine particles 71 migrate between the transparent electrode 31 and the transparent electrodes 35 depending on the voltage applied thereto, whereby the color density of the display device 100A2 can be varied. A method of forming the charged colored fine particles 71 separately for each color is, for example, such a way that the charged colored fine particles 71 dispersed in a solution are provided between the resin walls 39 divided for each color by an ink jet process. When the charged colored fine particles 71 cannot be adjusted to a desired color, the charged colored fine particles 71 different in color may be contained in a single pixel in the form of a mixture.

Figure 2:
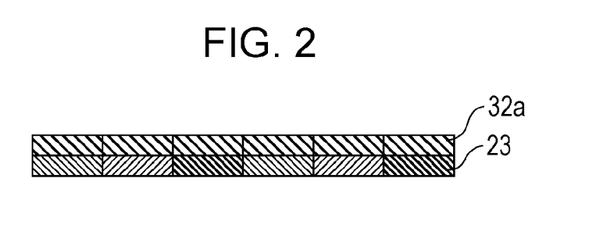
FIG. 2 is a schematic sectional view illustrating a modification of color filter layers used in a display device 100A.

As shown in FIG. 2, the electrochromic layers 32*a* may be overlaid with, for example, color filters 23 containing a conventional pigment. The active color filter layers 32 are placed so as to overlap the color filters 23 when viewed from a screen of the display device. This enables high-color purity display when the electrochromic layers 32*a* are in a colored state and also enables display valuing lightness rather than color purity when the electrochromic layers 32*a* are in an uncolored state without switching the color filters between a coloring state and an uncolored state. The electrophoretic layers 32*b* may also be overlaid with color filters containing a conventional pigment.

A black matrix made of metal or resin may be placed at a position between different colors of the electrochromic layers 32*a* (or the electrophoretic layers 32*b*) or between, for example, pixels of the insulating substrate 21. Alternatively, black resin walls may be placed between different colors of the electrochromic layers 32a (or the electrophoretic layers 32b).

The light-modulating layer 17 is, for example, a scattering liquid crystal layer. Among scattering liquid crystal layers, the light-modulating layer 17 is a normal mode of PNLC (polymer network liquid crystal) layer or PDLC (polymer dispersed liquid crystal) layer that causes scattering or becomes transparent when the voltage applied thereto is low or high, respectively. Alternatively, the light-modulating layer 17 may be, for example, a liquid crystal layer containing liquid crystal molecules oriented in a TN (twisted nematic) mode, oriented in parallel, or vertically orientated; a reverse mode of PNLC layer or PDLC layer that becomes transparent or causes scattering when the voltage applied thereto is low or high, respectively; a host-guest liquid crystal; or a cholesteric liquid crystal layer (for example, a broad-band cholesteric liquid crystal layer with a selective reflection wavelength set in a broad wavelength range or a cholesteric liquid crystal layer which has a selective reflection wavelength set in an infrared range and which performs display in a scattering or transmission mode). The light-modulating layer 17 may be an electrophoretic layer containing liquid or gas, an electrowetting (EW) layer, a mechanical shutter layer, or the like.

A reverse mode of PNLC layer or PDLC layer is composed of a combination of a polymer having no refractive index anisotropy and an n-type liquid crystal material. A vertical alignment film is placed between the first substrate 11 and the insulating substrate 21 so as to be in contact with the PNLC layer or the PDLC layer. A reverse mode of PNLC layer or PDLC layer may be composed of a combination of a polymer having refractive index anisotropy and an n-type liquid crystal material. Alternatively, the PNLC layer or the PDLC layer may be composed of a combination of a polymer having refractive index anisotropy and a p-type liquid crystal material. In this case, a horizontal alignment film is placed between the first substrate 11 and the insulating substrate 21 so as to be in contact with the PNLC layer or the PDLC layer. A normal mode of PNLC layer or PDLC layer may be placed instead of a reverse mode of PNLC layer or PDLC layer. A normal mode of PNLC layer or PDLC layer is composed of a combination of a polymer having no refractive index anisotropy and a p-type liquid crystal material. In this case, a film such as an alignment film need not be placed and a horizontal alignment film may be placed between the first substrate 11 and the insulating substrate 21 so as to be in contact with the PNLC layer or the PDLC layer.

When the PNLC layer or PDLC layer is formed, ultraviolet irradiation is performed. In this operation, an ultraviolet ray is applied to a substrate having no electrochromic layers 32a or electrophoretic layers 32b, whereby polymerization can be efficiently performed and properties of the light-modulating layer 17 can be equalized between the pixels.

When the light-modulating layer 17 is, for example, a liquid crystal layer containing liquid crystal molecules oriented in a TN mode or oriented in parallel, a polarizer is used. Alternatively, a λ/4 retardation film or another retardation film may be used. The polarizer of the retardation film may be provided by a known method.

Figure 3:
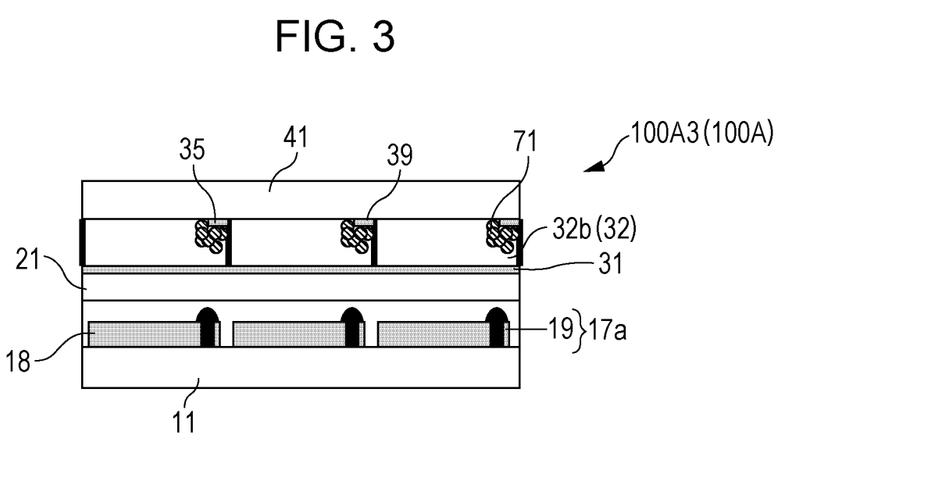
FIG. 3 is a schematic sectional view illustrating a modification of color filter layers used in a display device 100A according to an embodiment of the present invention.

FIG. 3 is a schematic sectional view of a display device 100A3. The display device 100A3 is a display device in which an electrowetting (EW) layer 17a is used instead of the light-modulating layer 17 of the display device 100A2. The display device 100A3 includes a colored polar solution (stored in reservoirs 19 as shown in FIG. 3), a uncolored (transparent) non-polar solution, protruding sections 18 made of a photosensitive resin (for example, Model SU-8 (produced by Nippon Kayaku Co., Ltd.)), and the reservoirs 19. The colorless polar solution is, for example, an aqueous solution of potassium chloride. The uncolored (transparent) non-polar solution is, for example, silicone oil. Reflective electrodes, which are not shown, made of Al or the like are placed on flat portions of the protruding sections 18 that are located on the observer side. The reflective electrodes are hydrophobic. Hydrophobic transparent electrodes may be used instead of the reflective electrodes. In this case, a reflective layer or a reflector is separately placed. When the display device 100A3 is, for example, an active matrix addressing type of display device, the reflective electrodes are electrically connected to the drain electrodes of TFTs, formed on the first substrate 11 side of the protruding sections 18, through contact holes. A transparent electrode, which is not shown, is placed on the EW layer 17a side of the insulating substrate 21. The transparent electrode is hydrophobic. When no voltage is applied to the EW layer 17a, the colored polar solution is stored in the reservoirs 19 and the EW layer 17a is filled with the non-polar solution, that is, silicone oil; hence, for example, the color of silicone oil (for example, colorless) is displayed. When a voltage is applied to the EW layer 17a, the colored polar solution spreads on the flat portions of the protruding sections 18 that are located on the observer side and therefore the color of the colored solution is displayed.

When the display device 100A3 includes, for example, electrophoretic layers 32b as shown in FIG. 3, the aperture ratio of pixels can be increased in such a manner that light-shielding regions (for example, the reservoirs 19) are formed on the first substrate 11 and transparent electrodes 35 for collecting charged colored fine particles 71 in the electrophoretic layers 32b are formed so as to overlap the light-shielding regions when viewed in a direction normal to a screen of the display device 100A3. In the case where opaque electrodes are used instead of the transparent electrodes 35, the opaque electrodes are formed so as to overlap light-shielding regions of the display device 100A3 other than the opaque electrodes. When the light-modulating layer 17 is an electrophoretic layer or mechanical shutter layer other than an EW layer, the transparent electrodes 35 are formed so as to overlap the light-shielding regions.

When the display device 100A is an IPS liquid crystal display device or includes a mechanical shutter layer, the transparent electrode 25 need not be formed. When the light-modulating layer 17 is a PNLC layer, a PDLC layer, a scattering transmission type of cholesteric liquid crystal layer, or the like or the display device 100A is a liquid crystal display device including a polarizer, a reflective film is provided on the opposite side of the first substrate 11 from the light-modulating layer 17. Alternatively, reflective electrodes, made of Al (aluminium), reflecting visible light may be formed instead of the transparent electrodes 15. When the light-modulating layer 17 is a PNLC layer, a PDLC layer, a cholesteric liquid crystal layer, or the like, dark display can be performed in such a manner that a black or dark light-absorbing layer is placed on the opposite side of the first substrate 11 from the light-modulating layer 17.

Figure 4:
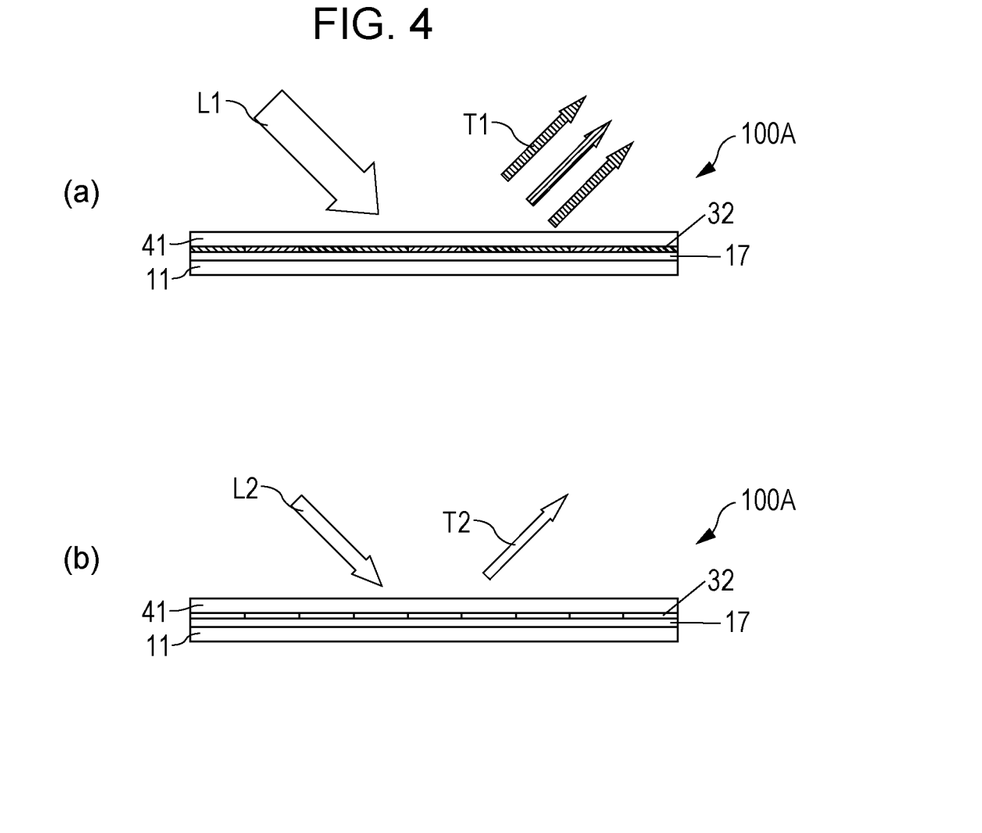
FIGS. 4(a) and 4(b) are schematic views illustrating the display state of a display device 100A.

FIGS. 4(a) and 4(b) are referred to below.

The active color filter layers 32, such as electrochromic layers or electrophoretic layers, can be operated independently of the switching of the light-modulating layer 17. For example, when the active color filter layers 32 are put in a colored state in the bright daytime outdoors, light T1 which is incident on the display device 100A (light L1) to form an image displayed on the display device 100A becomes colored light (color light) as shown in FIG. 4(a). In contrast, when the active color filter layers 32 are put in an uncolored state in the nighttime or in an indoor dark place (or a bright place), light T2 which is incident on the display device 100A (light L2) to form an image displayed on the display device 100A becomes colorless light.

As described above, the display device 100A performs full-color display, mono-color display, or area color display in a bright place and can perform high-lightness display when the display device 100A is in a dark place or monochrome display needs to be performed. Thus, in reflective display in which display is performed using external light only without using a light source (for example, a backlight or the like), color display including color information and high-lightness display valuing visibility can be arbitrarily switched depending on a lighting environment. Since the electrochromic layers 32a and the electrophoretic layers 32b have memory properties, the power consumption of the display device 100A can be suppressed. Furthermore, chroma and lightness can be arbitrarily adjusted by adjusting, for example, the voltage applied to the electrochromic layers 32a or the electrophoretic layers 32b.

A display device 100B according to another embodiment of the present invention is described with reference to FIGS. 5 and 6.

The display device 100B is a see-through liquid crystal display device. The see-through liquid crystal display device is a display device including no backlight or reflector. Thus, an observer can see a background through the display device 100B in addition to a displayed image.

Figure 5:
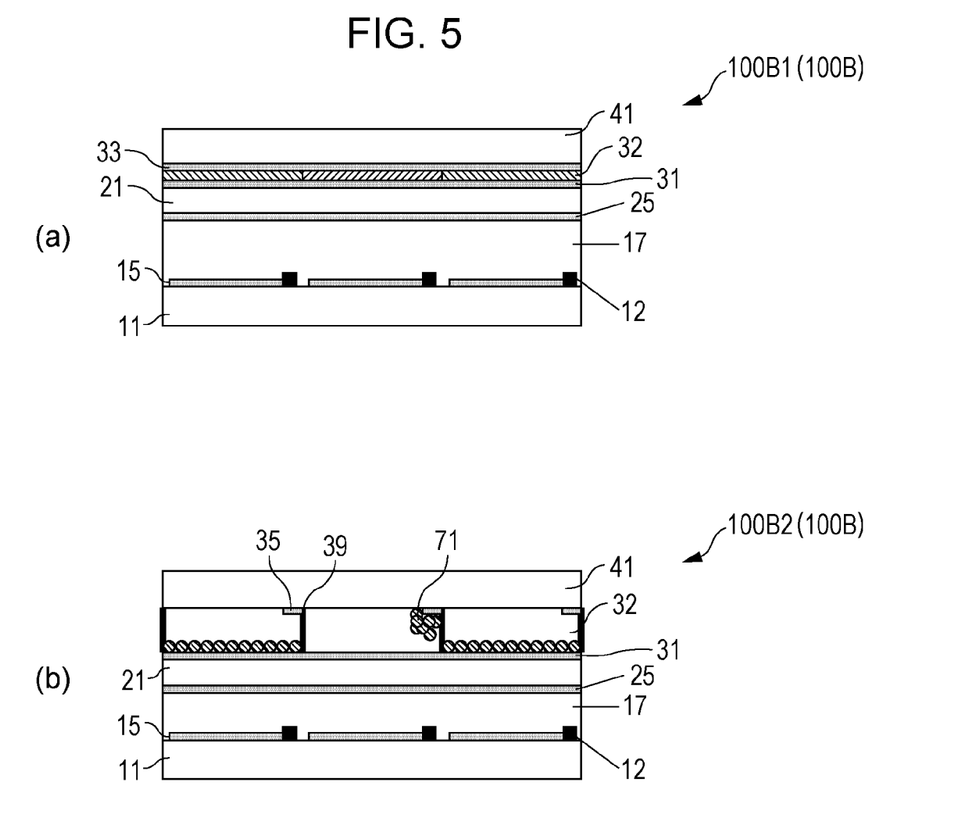
FIGS. 5(a) and 5(b) are schematic sectional views of display devices 100B1 and 100B2 (100B) according to other embodiments of the present invention.

FIG. 5 includes a schematic sectional view of a display device 100B1 and a schematic sectional view of a display device 100B2.

The display device 100B1 shown in FIG. 5(a) has substantially the same configuration as that of the display device 100A1 shown in FIG. 1(a). However, the display device 100B1 does not include such a reflector as included in the display device 100A1. The display device 100B1 may include such an insulating layer 13, which is not shown in FIG. 5(a), as included in the display device 100A1.

The display device 100B2 shown in FIG. 5(b) has substantially the same configuration as that of the display device 100A2 shown in FIG. 1(b). However, the display device 100B2 does not include such a reflector as included in the display device 100A2. The display device 100B2 may include such an insulating layer 13, which is not shown in FIG. 5(b), as included in the display device 100A2.

Figure 6:
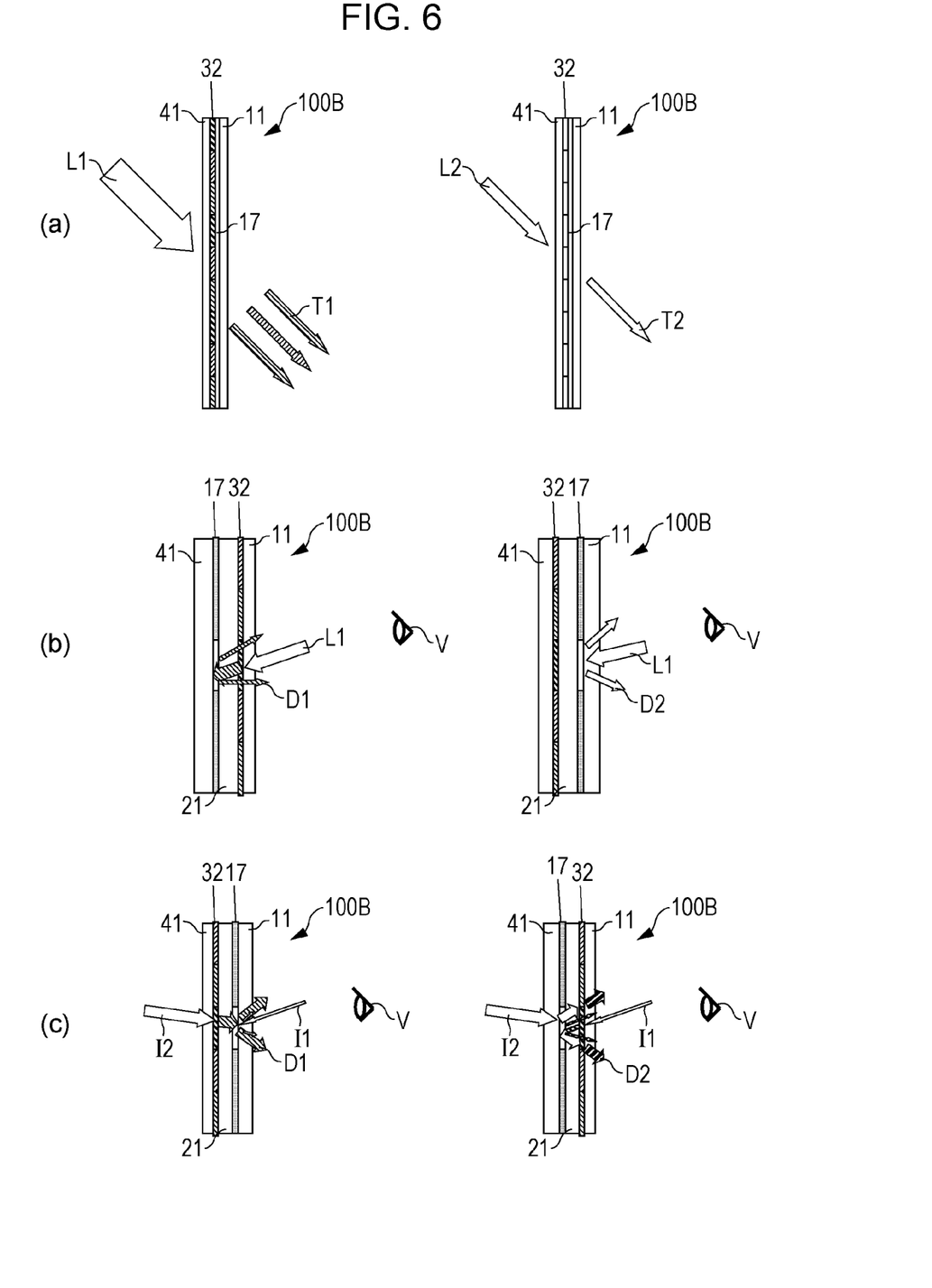
FIGS. 6(a) to 6(c) are schematic sectional views of a display device 100B.

FIG. 6 is referred to below. In FIGS. 6(b) and 6(c), only light associated with an observer V is shown for the sake of simplicity.

As shown in the left side of FIG. 6(a), the display device 100B puts active color filter layers 32 in a colored state in the bright daytime outdoors to convert light T1 forming an image displayed on the display device 100B from light L1 incident on the display device 100B into colored light (color light). On the other hand, as shown in the right side of FIG. 6(a), the active color filter layers 32 are put in a colored state in the nighttime or under indoor dark circumstances, whereby light T2 forming an image displayed on the display device 100B is converted from light L2 incident on the display device 100B into uncolored light.

When a light-modulating layer 17 is, for example, a layer, such as a PNLC layer or a PDLC layer, performing display by scattering incident light L1, the active color filter layers 32 are placed closer to an observer V than the light-modulating layer 17 as shown in the left side of FIG. 6(b), whereby light scattered by the light-modulating layer 17 can be converted into sufficiently colored light D1. In contrast, when the light-modulating layer 17 is placed closer to an observer V than the active color filter layers 32 as shown in the right side of FIG. 6(b), light scattered by the light-modulating layer 17 is unlikely to be converted into sufficiently colored light D2.

When the active color filter layers 32 are placed closer to the side where, among lights incident on the display device 100B, strong light 12 is incident than the light-modulating layer 17 as shown in the left side of FIG. 6(c), the color purity of light D1 passing through the display device 100B is high. In contrast, when the active color filter layers 32 are placed closer to the side where, among the lights incident on the display device 100B, weak light I1 is incident than the light-modulating layer 17 as shown in the left side of FIG. 6(c), the color purity of light D2 passing through the display device 100B is low.

The active color filter layers 32 may be placed on both the first substrate 11 side and second substrate 41 side of the insulating substrate 21 of each of the display devices 100B1 and 100B2. This applies to see-through liquid crystal display devices described below.

A display device 100C according to an embodiment of the present invention is described below with reference to FIGS. 7 and 8. The display device 100C is a see-through liquid crystal display device and may be converted into a reflective liquid crystal display device or a transmissive liquid crystal display device.

Figure 7:
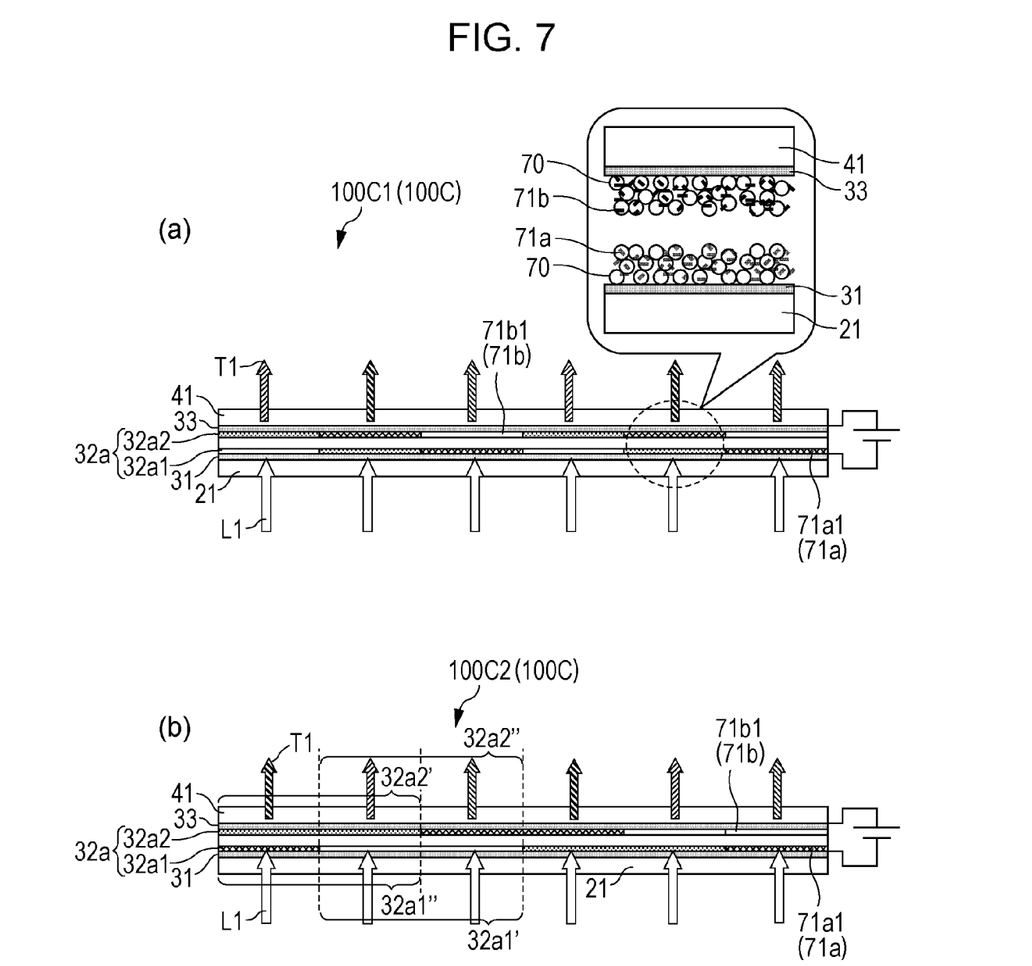
FIGS. 7(a) and 7(b) are schematic sectional views of display devices 100C1 and 100C2 (100C) according to other embodiments of the present invention.
Figure 8:
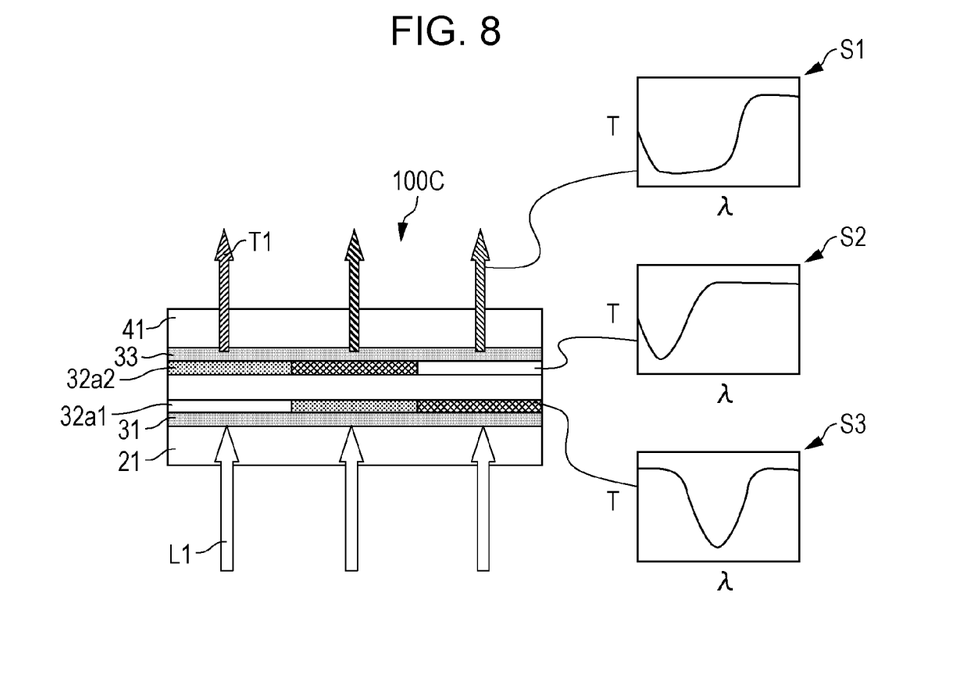
FIG. 8 is a schematic view illustrating the display state of a display device 100C.

FIGS. 7 and 8 are schematic sectional views of display devices 100C1 and 100C2 (100C).

As shown in FIG. 7, the display device 100C has substantially the same configuration as that of the display device 100B1 shown in FIG. 5(a). In FIG. 7, a first substrate 11, active elements 12, transparent electrodes 15 and 25, and a light-modulating layer 17 are not shown. Electrochromic layers 32a of the display device 100C include oxidation-type electrochromic sub-layers 32a1 and reduction-type electrochromic sub-layers 32a2. When being in a colored state, the oxidation-type electrochromic sub-layers 32a1 and the reduction-type electrochromic sub-layers 32a2 are different in light absorption wavelength from each other.

For example, a styryl material is cited as a color-developing material 71a for forming the oxidation-type electrochromic sub-layers 32a1. For example, a phthalic ester derivative is cited as a color-developing material 71b for forming the electrochromic layers 32a. A method of forming each layer is, for example, a way to allow titanium oxide particles to adsorb each material. The forming material is described.

As shown in FIGS. 7(a) and 7(b), titanium oxide particles 70 are provided on a transparent electrode 31 and a transparent electrode 33 on an insulating substrate 21 and a second substrate 41, respectively. The titanium oxide particles 70 provided on one of the substrates are allowed to adsorb the color-developing material 71a, whereby the oxidation-type electrochromic sub-layers 32a1 are formed. Furthermore, the titanium oxide particles 70 provided on the other one of the substrates are allowed to adsorb the color-developing material 71b, whereby the reduction-type electrochromic sub-layers 32a2 are formed. Thereafter, the substrates 21 and 41 are attached to each other such that the electrochromic layers 32a are interposed therebetween.

The titanium oxide particles 70 preferably have a size of 1 nm to 100 nm and more preferably 1 nm to 50 nm. In particular, when the size of the titanium oxide particles 70 is 50 nm or less, the Mie scattering of visible light by the titanium oxide particles 70 is suppressed and therefore the display device 100C has high transparency. A layer made of titanium oxide particles 70 preferably has a thickness of 1 μm to 10 μm. When the thickness of the layer made of titanium oxide particles 70 is more than 10 μm, the amount of an adsorbed dye is large; however, the display device 100C loses transparency. When the thickness of the layer made of titanium oxide particles 70 is less than 1 µm, the amount of an adsorbed dye is small and the display device 100C has poor color reproducibility. The inventors are investigating various display devices including electrochromic layers (for example, PCT/JP 2011/078794 (hereinafter referred to as Patent Application 1)). The entire disclosure of Patent Application 1 is incorporated herein by reference.

In the display device 100C1 shown in FIG. 7(a), the different color-developing materials 71a and 71b are adsorbed on the titanium oxide particles 70 for each pixel. For example, when the different color-developing materials 71a and 71b are adsorbed on the titanium oxide particles 70 for each of two of the pixels neighboring in a row direction like the display device 100C2 shown in FIG. 7(b), pitches of adsorbing the color-developing materials 71a and 71b can be increased and therefore manufacture is easy. In particular, as shown in FIG. 7(b), the oxidation-type electrochromic sub-layers 32a1 each include a first oxidation-type electrochromic region 32a1' which extends over two of the pixels neighboring in the row direction and which contains a single oxidation-type color-developing material. Likewise, the reduction-type electrochromic sub-layers 32a2 each include a first reduction-type electrochromic region 32a2' which extends over two of the pixels neighboring in the row direction and which contains a single reduction-type color-developing material. Furthermore, the oxidation-type electrochromic sub-layers 32a1 each include a second oxidation-type electrochromic region 32a1" which corresponds to two of the pixels neighboring in the row direction and which includes two portions each containing a corresponding one of oxidation-type color-developing materials 71a1 that are different in light absorption wavelength from each other when being in a colored state. Likewise, the reduction-type electrochromic sub-layers 32a2 each include a second reduction-type electrochromic region 32a2" which corresponds to two of the pixels neighboring in the row direction and which includes two portions each containing a corresponding one of reduction-type color-developing materials 71b1 that are different in light absorption wavelength from each other when being in a colored state. The electrochromic layers 32a are configured such that the first oxidation-type electrochromic region 32a1' faces the second reduction-type electrochromic region 32a2" and the first reduction-type electrochromic region 32a2' faces the second oxidation-type electrochromic region 32a1".

FIG. 8 is referred to below. FIG. 8 is a schematic sectional view of the display device 100C. With reference to FIG. 8, S1 is the schematic transmission spectrum of light T1 emitted from the display device 100C, S3 is the schematic absorption spectrum of an oxidation-type electrochromic sub-layer 32a1, and S2 is the schematic absorption spectrum of a reduction-type electrochromic sub-layer 32a2.

The electrochromic layers 32a have the above-mentioned two-layer structure as shown in FIG. 8 and therefore light T1 emitted from the display device 100C is allowed to have, for example, an R spectrum, a G spectrum, and a B spectrum even when the color-developing materials 71a and 71B (refer to FIG. 7), which form the oxidation-type electrochromic sub-layers 32a1 and the reduction-type electrochromic sub-layers 32a2, respectively, have a single maximum absorption spectrum.

The color-developing materials 71a and 71B usually have a single maximum absorption spectrum, are likely to particularly develop a cyan color (C), a magenta color (M), and a yellow color (Y), and are unlikely to develop R, G, and B. However, when high-color purity display is performed with three colors, three colors of R, G, and B are preferably used. In this embodiment, the electrochromic layers 32a, which have the two-layer structure, are used and therefore the color-developing materials 71a and 71B may be materials each developing C, M, or Y; hence, material selectivity is high. When a counter agent (for example, a material contained in layers facing the reduction-type electrochromic sub-layers 32a2) used is, for example, ferrocene, there is a problem in that the electrochromic layers 32a are yellowed even when the electrochromic layers 32a are in an uncolored state. However, in this embodiment, the oxidation-type and oxidation-type electrochromic sub-layers 32a1 and 32a2, which have good color developability and erasability, can be used and therefore desired color display can be achieved. The oxidation (or reduction) of the counter agent that has no direct bearing on color developability does not occur and both of the oxidation-type and oxidation-type electrochromic sub-layers 32a1 and 32a2 develop a color; hence, the efficiency of using electrical energy is high. For example, the same effects as those of the display device 100B can be obtained from the display device 100C.

A display device 100D according to an embodiment of the present invention is described below with reference to FIGS. 9 and 10. The display device 100D is a transmissive liquid crystal display device. The display device 100D can be converted into a semi-transmissive liquid crystal display device.

Figure 9:
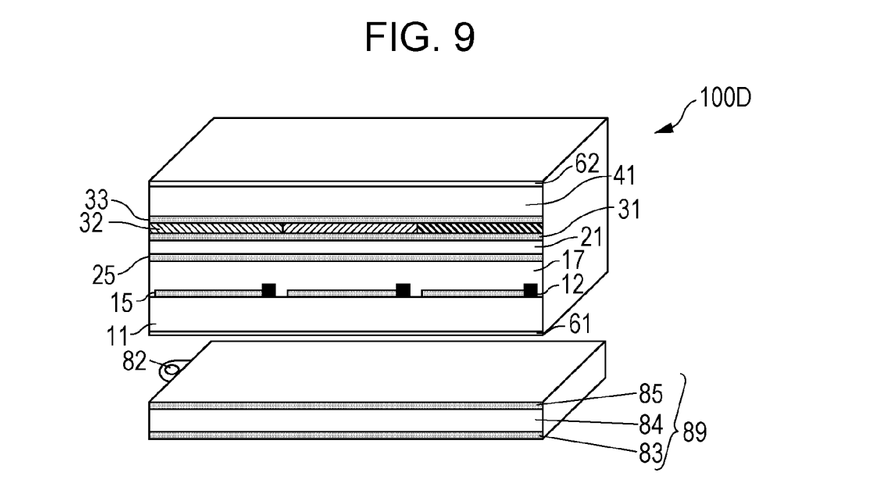
FIG. 9 is a schematic perspective view of a display device 100D according to another embodiment of the present invention.
Figure 10:
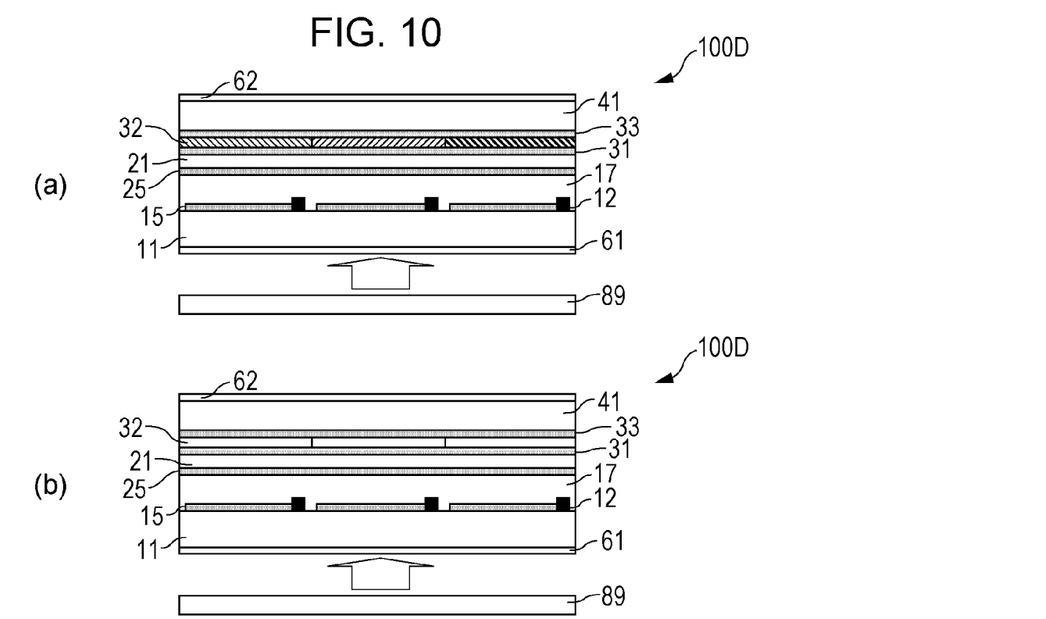
FIGS. 10(a) and 10(b) are schematic views illustrating the display state of a display device 100D.

FIG. 9 is a schematic perspective view of the display device 100D. FIG. 10 is a schematic sectional view of the display device 100D.

The display device 100D shown in FIG. 9 has substantially the same configuration as that of the display device 100B1 shown in FIG. 5(a). However, the display device 100D includes a backlight 89 located on the opposite side of a first substrate 11 from a light-modulating layer 17. The light-modulating layer 17 of the display device 100D is, for example, a TN layer. The display device 100D includes a polarizer 61 and a polarizer 62. The light-modulating layer 17 is placed between the polarizer 61 and the polarizer 62.

The backlight 89 includes, for example, a white LED 82 including a combination of a blue LED, a green phosphor, and a red phosphor; a light guide plate 84; a reflective sheet 83; and a diffusion sheet 85. The light guide plate 84 is placed between the reflective sheet 83 and the diffusion sheet 85. The white LED 82 is placed on a side surface of the light guide plate 84. The light guide plate 84 may be divided into a plurality of regions. The intensity of light emitted from the white LED 82 can be adjusted. A source of white light is not limited to any LED.

As shown in FIG. 10(a), the display device 100D performs color display when active color filter layers 32 are in a colored state. As shown in FIG. 10(b), the display device 100D performs high-lightness monochrome display when active color filter layers 32 are in an uncolored state.

When the display device 100D needs to perform color display, color display is performed by allowing the active color filter layers 32 to develop a color. When color display is unnecessary and high-light use efficiency display needs to be performed, high-transmittance display can be performed by rendering the active color filter layers 32 uncolored. This allows, for example, a mobile terminal to perform color display when contents such as full-color videos and photographs are displayed and also allows the mobile terminal to perform high-transmittance monochrome display when color display is unnecessary like reading an electronic book. Therefore, the brightness of a visible light backlight can be reduced and display can be performed with low power consumption. Furthermore, the balance between chroma and lightness can be adjusted by adjusting the intensity of light emitted from the visible light backlight and the color density of the active color filter layers 32 that are in a colored state. Furthermore, portions performing color display and portions performing high-lightness display can be separately displayed for each region in such a manner that a plurality of light sources are arranged and the turning on and off thereof are controlled.

Figure 11:
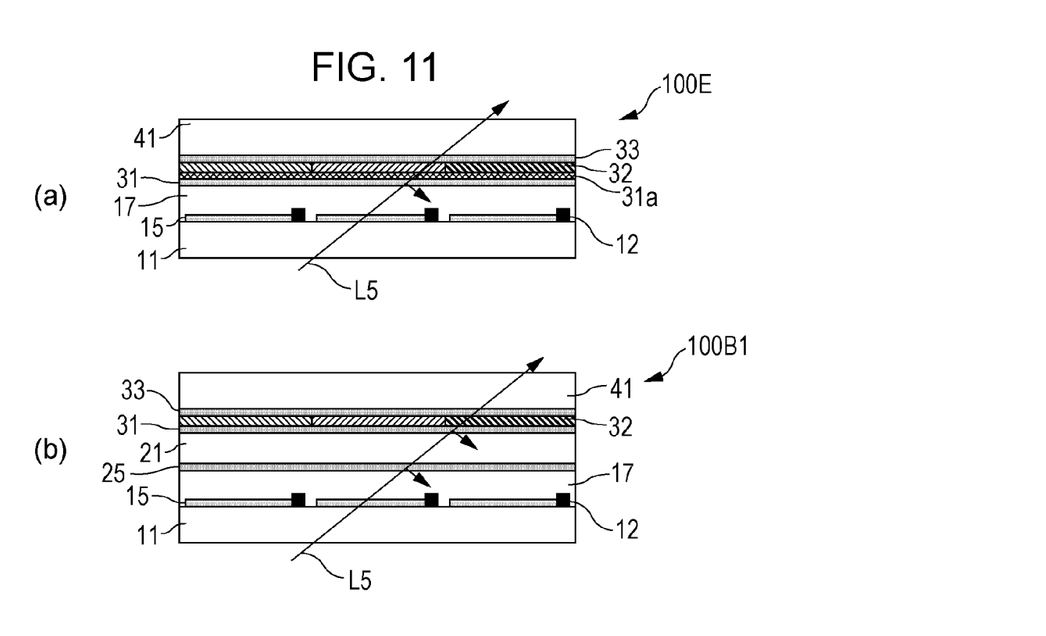
FIG. 11(a) is a schematic sectional view of a display device 100E according to another embodiment of the present invention and FIG. 11(b) is a schematic sectional view of a display device 100B1 described in comparison with a display device 100E.

A display device 100E according to an embodiment of the present invention is described below with reference to FIG. 11. The display device 100E is a see-through liquid crystal display device and may be a reflective display device or a transmissive display device.

FIG. 11(a) is a schematic sectional view of the display device 100E. FIG. 11(b) is a schematic sectional view of the display device 100B1 described in comparison with the display device 100E.

The substrate 100 shown in FIG. 11(a) is a display device that includes a layer 31a containing a conductive polymer (or solid electrolyte) instead of the insulating substrate 21 and transparent electrode 25 placed between the light-modulating layer 17 and active color filter layers 32 of the display device 100B1 (or display device 100A1). A voltage is applied to active color filter layers 32 through the conductive polymer (or solid electrolyte)-containing layer 31a.

The conductive polymer used is a PEDOT (polyethylenedioxythiophene) or polyaniline film, which has a coloring problem. A transparent electrode 31 may be formed by sputtering, vapor deposition, or applying a solution to these. The transparent electrode 31 is made of, for example, ITO. The solid electrolyte used is, for example, a polymer film containing Li (lithium) ions, a plastic crystal, or the like. Furthermore, the transparent electrode 31 may be formed by sputtering, vapor deposition, or applying a solution to these. The transparent electrode 31 can be formed from a PEDOT (polyethylenedioxythiophene) or polyaniline film other than ITO.

One increased in viscosity or gelled by a polymer is preferably used when the active color filter layers 32 are converted into the electrochromic layers 32a. The conductive polymer (or solid electrolyte)-containing layer 31a is formed on the electrochromic layers 32a by, for example, a roll-to-sheet method or the like. Thereafter, the transparent electrode 31 is preferably formed on the light-modulating layer 17 side of the conductive polymer (or solid electrolyte)-containing layer 31a by the above method. For example, a protective layer, which is not shown, is formed on the active color filter layer 32 side or light-modulating layer 17 side of the conductive polymer (or solid electrolyte)-containing layer 31a, the protective layer containing an organic substance and an inorganic substance and having a multilayer structure. Such a protective layer may be formed on the active color filter layer 32 side or light-modulating layer 17 side of the transparent electrode 31. A transparent electrode may be formed on the protective layer by the above method. The formation of the protective layer is capable of suppressing that a material forming the active color filter layers 32 and a material forming the light-modulating layer 17 seep into another layer. One including a protective film for preventing ions, oxygen, or the like from entering the active color filter layers 32 and transparent electrodes formed on two surfaces (a first principal surface and a second principal surface parallel to the a first principal surface) of the protective film may be formed by a roll-to-sheet method or the like instead of the conductive polymer (or solid electrolyte)-containing layer 31a and the transparent electrode 31. Among these transparent electrodes, the transparent electrode located on the active color filter layers 32 side is an electrode for applying a voltage to the active color filter layers 32. The protective film preferably has a thickness of, for example, 100 μm or less. When having such a thickness, the protective film can reduce color mixing due to parallax below.

As shown in FIGS. 11(a) and 11(b), the display device 100E does not include such an insulating substrate 21 or transparent electrode 25 as included in the display device 100B1 and therefore has no interface between the insulating substrate 21 and the transparent electrode 25 or between the transparent electrode 25 and the light-modulating layer 17. Thus, in the display device 100E, the number of times light L5 passing through transparent electrodes is small; hence, loss due to interfacial reflection or absorption is small and display with high-light use efficiency display is achieved. Furthermore, the displacement between the position of light L5 passing through the light-modulating layer 17 and the position of light L5 passing through the active color filter layers 32 is small with respect to light L5 displaced from a direction normal to a screen of the display device 100E. Thus, the distance between the active color filter layers 32 and the light-modulating layer 17 is small and therefore high-color purity display with little color mixing due to parallax can be achieved.

Among the display devices 100A to 100E, an antireflective film such as an AR (anti-reflection) film, a LR (low reflection) film, or an amorphous film may be placed on at least one surface of a display device out of see-through display devices or an observer-side surface of a display device out of transmissive and reflective display devices. The placement of such an antireflective film allows the display devices 100A to 100C and 100E to have enhanced mirror texture (mirror-like texture) or transparency and allows the display device 100D to perform display little affected by the environment of usage.

As described above, high-visibility images are obtained using the display devices 100A to 100E and a display device with low power consumption is obtained. Furthermore, a high-color purity display device with little color mixing due to parallax can be provided.

INDUSTRIAL APPLICABILITY

A display device according to the present invention is suitable for use in various electronics including portable devices such as mobile phones, pocket gaming machines, PDAs (personal digital assistants), portable TVs, remote controllers, notebook personal computers, and other portable terminals. Furthermore, such a display device is suitable for use as a large-size display device such as an information display or a digital signage or an alternative to a window.

REFERENCE SIGNS LIST 11, 21, 41 Substrate
12 Active elements
13 Insulating layer
15, 25, 31, 33, 35 Transparent electrodes
17 Light-modulating layer
32 Active color filter layers
32a Electrochromic layers
32b Electrophoretic layers
39 Resin walls
100A1, 100A2, 100A3, 100A Display device

The invention claimed is:
1. A display device comprising:
a first substrate and second substrate that are placed so as to face each other;
active color filter layers which are placed between the first substrate and the second substrate, which have memory properties, and which become in a colored state or an uncolored state depending on the voltage applied thereto; and a light-modulating layer for controlling the intensity or degree of scattering of light incident on the active color filter layers or the intensity or degree of scattering of light passing through the active color filter layers; wherein the active color filter layers are electrochromic layers; and the electrochromic layers include oxidation-type electrochromic sub-layers containing an oxidation-type color-developing material and reduction-type electrochromic sub-layers containing a reduction-type color-developing material and, in a pixel, the oxidation-type color-developing material and the reduction-type color-developing material are different in light absorption wavelength from each other when being in a colored state.

2. The display device according to claim 1, wherein the oxidation-type electrochromic sub-layers each include a first oxidation-type electrochromic region which extends over two pixels neighboring in a row direction and which contains a single oxidation-type color-developing material and the reduction-type electrochromic sub-layers each include a first reduction-type electrochromic region which extends over two pixels neighboring in the row direction and which contains a single reduction-type color-developing material.

3. The display device according to claim 2, wherein the oxidation-type electrochromic sub-layers each include a second oxidation-type electrochromic region which corresponds to two pixels neighboring in the row direction and which includes two portions each containing a corresponding one of oxidation-type color-developing materials that are different in light absorption wavelength from each other when being in a colored state, the reduction-type electrochromic sub-layers each include a second reduction-type electrochromic region which corresponds to two pixels neighboring in the row direction and which includes two portions each containing a corresponding one of reduction-type color-developing materials that are different in light absorption wavelength from each other when being in a colored state, and the electrochromic layers are configured such that the first oxidation-type electrochromic region faces the second reduction-type electrochromic region and the first reduction-type electrochromic region faces the second oxidation-type electrochromic region.

4. The display device according to claim 1, further comprising a backlight.

5. The display device according to claim 1, wherein the display device is a see-through display device.

6. The display device according to claim 5, wherein the active color filter layers are placed closer to the side where, among lights incident on the see-through display device, strong light is incident than the light-modulating layer.

7. The display device according to claim 1, wherein the active color filter layers are placed closer to the observer side than the light-modulating layer.

8. The display device according to claim 1, further comprising a layer containing a conductive polymer or solid electrolyte, wherein a voltage is applied to the active color filter layers through the conductive polymer or solid electrolyte-containing layer.

9. The display device according to claim 8, wherein a protective layer is placed on the active color filter layer side or light-modulating layer side of the conductive polymer or solid electrolyte-containing layer.

10. The display device according to claim 1, further comprising a protective layer having a first principal surface and a second principal surface parallel to the first principal surface, wherein an electrode is placed on each of the first principal surface and the second principal surface and a voltage is applied to the active color filter layers through one of the electrodes that is on the active color filter layer side.

11. The display device according to claim 1, wherein the light-modulating layer is an electrowetting layer.

12. The display device according to claim 1, wherein the light-modulating layer is a liquid crystal layer.

13. The display device according to claim 12, wherein the light-modulating layer is a scattering liquid crystal layer.

14. The display device according to claim 1, further comprising color filter layers, wherein the active color filter layers are placed so as to overlap the color filters when viewed in the direction normal to the screen of the display device.

15. A display device, comprising:

a first substrate and second substrate that are placed so as to face each other;

active color filter layers which are placed between the first substrate and the second substrate, which have memory properties, and which become in a colored state or an uncolored state depending on the voltage applied thereto; and a light-modulating layer for controlling the intensity or degree of scattering of light incident on the active color filter layers or the intensity or degree of scattering of light passing through the active color filter layers; wherein the display device is a see-through display device; and the active color filter layers are placed on the first substrate side of the light-modulating layer and other active color filter layers are placed on the second substrate side of the light-modulating layer.

16. A display device, comprising:

a first substrate and second substrate that are placed so as to face each other;

active color filter layers which are placed between the first substrate and the second substrate, which have memory properties, and which become in a colored state or an uncolored state depending on the voltage applied thereto;

a light-modulating layer for controlling the intensity or degree of scattering of light incident on the active color filter layers or the intensity or degree of scattering of light passing through the active color filter layers; and a layer containing a conductive polymer or solid electrolyte, wherein a voltage is applied to the active color filter layers through the conductive polymer or solid electrolyte-containing layer; wherein a protective layer is placed on the active color filter layer side or light-modulating layer side of the conductive polymer or solid electrolyte-containing layer; and a transparent electrode is placed on the light-modulating layer side of the conductive polymer or solid electrolyte-containing layer and the protective layer is placed on the active color filter layer side or light-modulating layer side of the transparent electrode.

* * * * *